3,321,701
IONIZATION MANOMETER WHICH COMPARES AN ION NEUTRALIZED ELECTRON BEAM FLOW WITH AN UNNEUTRALIZED BEAM FLOW
Merton H. Crowell, Morristown, N.J., assignor to Bell Telephone Laboratories, Incorporated, New York, N.Y., a corporation of New York
Filed July 8, 1963, Ser. No. 293,346
7 Claims. (Cl. 324—33)

This invention relates to an apparatus for measuring very low gas pressures and, more particularly, to ionization manometer devices.

The most widely used device for measuring gas pressures below $10^{-3}$ millimeters of mercury is the conventional ionization manometer which comprises a cathode, anode, and ion collector enclosed within an envelope together with a sample of the gas to be measured. The device is operated by emitting a predetermined electron current from the cathode toward the anode. Some of the emitted electrons collide with gas molecules to form positively charged gas ions which are then collected by the ion collector. The number of gas ions impinging on the ion collector is proportional to the gas pressure within the envelope and can be computed by measuring the electrical ion current in the ion collector. A sensitive ammeter connected to the ion collector is therefore scaled to give a direct reading of gas pressure within the envelope.

When the conventional ionization manometer is used to measure pressures below $10^{-9}$ millimeters of mercury, low energy X-rays, which are generated by the electrons striking the anode, may impinge on the ion collector to release a significant number of photoelectrons by comparison to the ion current. Under such conditions, the photoelectron current interferes with the accurate measurement of the ion current. Several new devices have been proposed which do not generate a separate ion current and which would therefore be unaffected by spurious X-rays.

One such device employs an electron beam which is directed at a collector through an aperture that is slightly smaller than the cross-section of the beam. The normal cross-sectional area of an electron beam is dependent upon the inherent mutual repelling effect of space-charge forces among the electrons. However, the electron beam will inevitably ionize a predetermined proportion of the gas molecules within the envelope; these positive ions will counteract or neutralize the space-charge forces thereby reducing the cross-sectional area of the beam to increase the proportion of electrons which flow through the aperture. The rate of space-charge neutralization, and hence, the rate of increase of electron flow through the aperture, is proportional to the gas pressure within the envelope. This change, however, is a transient phenomenon because the ions in the beam quickly build up to a maximum. Efforts at measuring the neutralization rate have been largely unsuccessful, mainly because the transient currents are small with respect to the total electron beam current, which must also be measured.

It is an object of this invention to provide a device for measuring with accuracy extremely low gas pressures.

It is another object of this invention to provide a device for measuring the transient effects of space-charge neutralization by positive ions in an electron beam.

These and other objects of my invention are attained in a manometer system which employs the principle of space-charge neutralization. According to one aspect of the invention, ion-neutralized electron beam flow is constantly compared with unneutralized beam flow, the difference between them being indicative of gas pressure within the envelope. Because the two beam currents are subtracted, the only current which is relayed to the indicator is that which directly results from the ionization.

The device comprises the following elements arranged in succession in an envelope: an electron gun, a pair of deflecting plates, a shield plate with one aperture on the tube axis and one displaced aperture, and an electron collector behind each of the two apertures. The deflecting plates periodically deflect the beam from the on-axis aperture to the displaced aperture. Both of the apertures are slightly smaller than the beam cross-section so that when the electron beam is directed at the on-axis aperture, any gas molecules in the envelope will increase the electron flow through the aperture by the principle of space-charge neutralization. On the other hand, when the beam is deflected to the off-axis aperture, there is no space-charge neutralization because the positive ions are attracted toward the negative deflection plate rather than being contained within the beam. Hence, the difference of current flow through the two apertures is indicative of the gas pressure within the envelope.

The two collectors are each connected to an R-C filter (a resistance and a capacitance in parallel) and to a direct-current ammeter. With the two shield plate apertures considered as the equivalent of electrical resistors, this connection can be analyzed as a balanced bridge. The change of current through one of the apertures by space-charge neutralization operates to unbalance the bridge causing current to pass through the ammeter which is indicative of the difference of current flow through the two apertures.

As will become clearer hereafter, the sensitivity and accuracy of the device can be impaired if ions within the beam impinge on the cathode or on the shield plate. To prevent this, two positively biased rods are placed on opposite sides of the beam adjacent the electron gun and another pair is located adjacent the shield plate. Each pair of rods sets up a barrier which traps the positive ions within the undeflected electron beam and prohibits undesired leakage. Ion leakage from the sides of the beam is prevented by using a ribbon electron beam; i.e., a beam that is several times wider in one dimension than in the other.

These and other objects and features will be more clearly understood from a consideration of the following detailed description, taken in conjunction with the accompanying drawing, in which.

Figure 1:
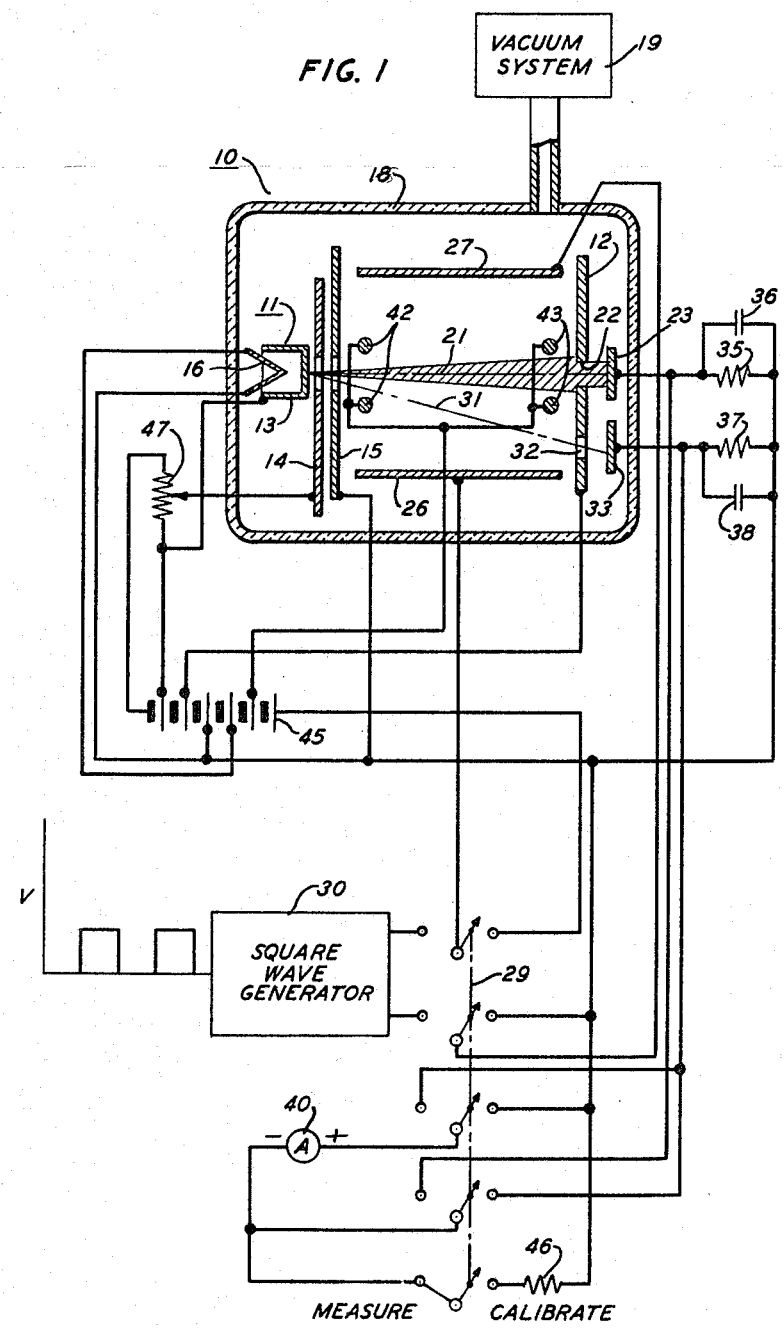
FIG. 1 is a schematic illustration of one embodiment of the invention.

Referring now to FIG. 1, there is shown a manometer 10 comprising an electron gun 11 for forming and projecting a beam of electrons toward a shield plate 12. The electron gun is shown as comprising a cathode 13, a control grid 14, an anode 15, and a heater 16, although other structures could alternatively be used. The manometer elements are enclosed within an envelope 18 which is connected to a vacuum system 19. The purpose of the manometer is to generate the electrical current indicative of the gas pressure within the envelope 18 which, because of the inter-connection, is the same as the gas pressure within the vacuum system 19.

During operation, the electron gun projects an electron beam along a path 21 which is coincident with the tube axis, through an aperture 22 in the shield plate 12, toward a collector 23. Aperture 22 is slightly smaller than the normal cross-section of the beam so that many of the electrons impinge on the shield plate as illustrated by the schematic representation of the electron beam. The cross-sectional area of any electron beam is determined in part by the mutually repulsive space-charge forces of the electrons; as the beam current is increased, the greater space-charge repulsion increases the beam cross-section. However, when gas molecules are intercepted by the beam, they are ionized to form positively charged ions; these positive particles counteract or neutralize the space-charge forces, and thereby reduce the cross-sectional area of the beam. As the beam cross-section is reduced, the proportion of the electrons flowing through aperture 22 is increased, thereby increasing the current flow in collector 23.

Figure 2:
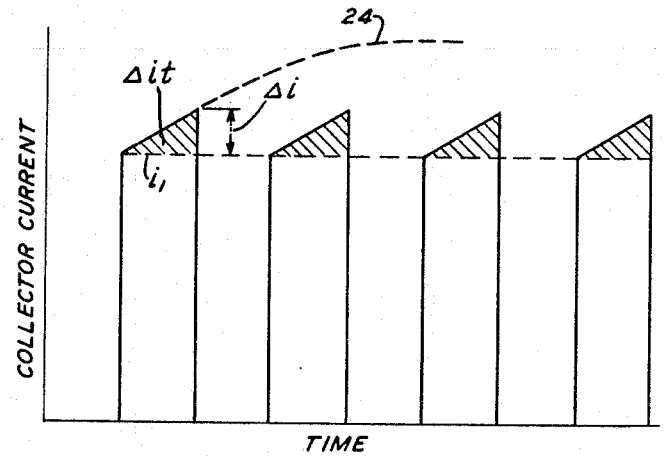
FIG. 2 is a graph of voltage versus time in one of the electron collectors of the device of FIG. 1.

The effect of space-charge neutralization on the collector current in collector 23 is illustrated in FIG. 2 which is a graph of collector current in collector 23 versus time. The quantity of current which would pass through aperture 22 and impinge on collector 23 in the absence of ionization is represented by $i_1$. If gas molecules are present within the envelope, the current passing through the aperture will gradually increase to a maximum, as indicated by dotted curve 24. The rate at which the current increases, or in other words, the slope of curve 24, is proportional to the gas pressure within the envelope.

Since the rate of increase of current is a transient phenomenon, a meaningful measurement of the current increment requires that the positive ions be periodically "swept out" of the beam. This is done by a pair of deflection plates 26 and 27 which are located between the electron gun and the shield plate. The deflection plates are connected to a ganged switch 29 which, in its operative position, is switched to the left (the measure position) to contact a square-wave generator 30. The generator periodically deflects the beam downwardly to path 31 and attracts the positive ions within the beam upwardly, thereby periodically removing all positive ions from the beam. The rate of increase of charge flow through the aperture can therefore be repeatedly measured; this incremental charge is shown in FIG. 2 by the shaded portion $\Delta it$.

The periodic beam deflection serves a second purpose by directing the beam through a second aperture 32 in the shield plate, toward a second collector 33 to establish a reference current to which the ion-neutralized current in the collector 23 can be compared. The number of electrons that flow through aperture 32 against the collector 33 is not affected by the gas pressure within the envelope because the electric deflecting field precludes any ion-trapping within the beam. Aperture 32 is identical with aperture 22 and so only the current $i_1$, shown in FIG. 2, flows in collector 33 when the beam is deflected to path 31. On the other hand, the current in collector 23, as explained above, is increased by the incremental charge flow $\Delta it$ due to space-charge neutralization.

Collector 23 is connected to a first R-C filter comprising a resistance 35 and a capacitance 36. Collector 33 is connected to an identical R-C filter comprising a resistance 37 and a capacitance 38. With the switch 29 in the operative left-hand position, collectors 23 and 33 are also connected to an ammeter 40. The purpose of the external circuitry is to compare the currents flowing in collectors 23 and 33 so that their difference can be indicated by ammeter 40. This is desirable because $i_1$ is so large with respect to $\Delta i$, the maximum current increment shown in FIG. 2, that it would ordinarily make accurate measurement of $\Delta i$ very difficult.

Figure 3:
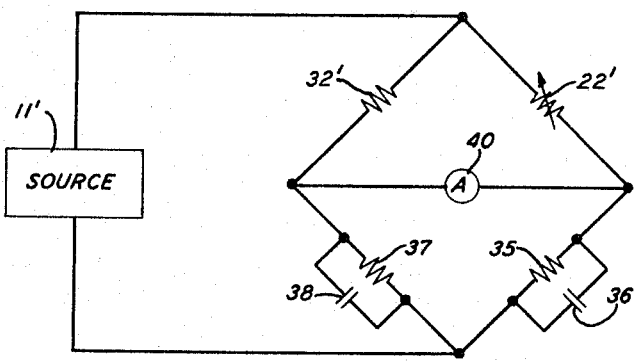
FIG. 3 is a functional circuit diagram of the device of FIG. 1.

The operation of the external circuitry can be best appreciated from a consideration of FIG. 3 which is a functional diagram of the external circuitry of the manometer system. Considering the electron gun 11 of FIG. 1 to be the equivalent of a direct-current source 11', apertures 22 and 32 can be considered as resistors 22' and 32', since they restrict beam current flow. The two identical R-C filters 37–38 and 35–36 are connected to resistors 22' and 32' to form a balanced bridge. When the bridge is unbalanced, through a change in resistance of resistor 22' with respect to resistor 32', current flows through ammeter 40. It can be appreciated that in the device of FIG. 1 this incremental current results from incremental charge $\Delta it$, because in all other situations the bridge is balanced.

The balanced bridge analogy presupposes that current is delivered simultaneously to resistors 32' and 22', when in fact it is delivered successively in the circuit of FIG. 1. Nevertheless, the circuit of FIG. 1 will function as a balanced bridge if the time constants of the two R-C circuits are large with respect to the period of the square-wave deflecting voltage. It is useful to generate current in square-wave generator 30 at a frequency of 60 to 1,000 cycles per second to avoid ion saturation in the electron beam when measuring gas pressures below $10^{-8}$ millimeters of mercury. With frequencies in this range, the resistances 35 and 37 may, for example, each have a value of 1 megohm, and the capacitances 36 and 38 may have a value of 1 microfarad for giving an appropriately long time constant.

It is apparent that, for the external circuitry to operate as a balanced bridge, the electron beam must be centered on path 21 for fifty percent of the deflection cycle and on path 31 for the other fifty percent. That being the case, incremental charge $\Delta it$ is generated during only half the time of the manometer operation. Assuming that the rate of change of current due to space-charge neutralization is linear, the average incremental current is equal to half the maximum incremental current $\Delta i$. Combining these two considerations, the average direct-current $I_{ave}$ which flows along the circuit as a result of space-charge neutralization is equal to one-quarter the maximum incremental current $\Delta i$ or $$I_{ave} = \frac{\Delta i}{4} \qquad (1)$$

Half of $I_{ave}$ flows through the meter 40 if the resistance of the meter is very small; if the resistance of the meter is substantial, the actual D.-C. current $I_m$ which is recorded by the meter is $$I_m = \frac{I_{ave} R}{2R + R_m} \qquad (2)$$

where R is the resistance of each of the resistors 35 and 37, and $R_m$ is the resistance of the meter.

The linear buildup of ions within the electron beam results from the successive trapping of positive ions within the negatively charged electron beam. If the positive ions impinge on the cathode or the shield plate 12, the rate of change of collector current may not be linear and the accuracy of the device may be impaired. In order to minimize this ion leakage, two positively biased rods 42 are located on opposite sides of the beam adjacent the electron gun and another pair of rods 43 is located adjacent the shield plate. Each pair of rods establishes a positive potential barrier across the electron beam which insures effective ion trapping by the beam by preventing positive ion leakage toward the cathode and shield plate. Similar ion trapping electrodes could be placed on the sides of the beam, but usually, ion leakage from the sides can more easily be prevented by using a ribbon electron beam. For example, where the beam current is between 1 and 10 milliamperes a beam width of 0.5 inch is sufficiently wide to avoid the effect of ion leakage to the sides.

From the foregoing, it is clear that the accuracy of the manometer requires the generation of a precise predetermined beam current by the electron gun 11. For this reason, a calibration circuit is included within the device so that the electron beam current can be accurately adjusted before each operation of the manometer. This circuit is activated by switching gang switch 29 to the right (the calibrate position), to connect a direct-current voltage source 45 to the deflection plates 26 and 27. Simultaneously, electron collector 33 is connected to ammeter 40 and a shunt resistor 46. The deflection source 45 deflects the beam along path 31 so that a predetermined proportion of the beam current is directed through the ammeter 40 via collector 33, while the remainder of the current is shunted by resistor 46. The electron beam current can be adjusted, for example, by adjusting a potentiometer 47 which is connected to control grid 14, while monitoring the beam current on ammeter 40. The precise proportion of current that flows through ammeter 40 under proper conditions is, of course, determined by the size of the shunt resistor 46.

It is believed that the foregoing description is sufficiently detailed to permit one skilled in the art to make and use a device employing the inventive concepts involved. Nevertheless, because the device is intended for use at pressures which cannot be measured with conventional manometers, the following detailed description is presented to describe a preferred method by which ammeter 40 can be accurately calibrated in terms of gas pressure within the envelope 18:

(1) Adjust the anode voltage so that the voltage between the cathode and anode is in the range of 300 to 1000 volts.

(2) Adjust the power supply to the heater and the grid bias voltage until a reasonable value of cathode current is obtained; for example, for a ribbon beam width of 0.5 inch, the cathode current should be between 1 and 10 milliamperes.

(3) Center the beam on the off-axis aperture 32 and measure the beam current through the aperture. The beam current may be measured by moving switch 29 to the calibrate position (to the right).

(4) Formulate the ratio of beam current to cathode current on the off-axis slit. This ratio will be designated $\eta_0$.

(5) Move switch 29 to the measure position (to the left). It will be necessary to adjust the tube potentials so that the beam is centered on either path 21 or path 31 as it is moved back and forth by the square-wave generator. Typical relative tube potentials are shown by the electrode connections to direct-current source 45.

(6) Adjust the frequency of the square-wave generator 30 until a reasonable value of meter deflection is obtained on meter 40.

(7) The pressure may now be obtained from this meter reading which corresponds to $I_m$ amperes. It can be shown that the average current increment is related to pressure and the square-wave frequency as $$I_{ave} = \frac{I_c L^2 G P \eta_0^2}{16 W a \epsilon_0 V f} \quad (3)$$

where $I_c$ is the cathode current, L is the distance between the electron gun and shield plate 12, W is the width of the ribbon beam, $a$ is the height of the limiting apertures, $\epsilon_0$ is the dielectric constant of free space, V is the beam voltage, $f$ is the frequency of the square wave, P is the pressure in millimeters of mercury, $\eta_0$ is the ratio of beam current through the aperture to cathode current when the beam is centered on path 31, and G is a constant known in the art as the probability of ionization and is equal to the number of ions generated per electron per meter of path length at a pressure of 1 millimeter of mercury. The pressure may be found by substituting Equation 2 into Equation 3 which yields $$P = \frac{16 W a \epsilon_0 V f}{I_c L^2 G \eta_0^2} \left( \frac{2R + R_m}{R} \right) I_m \quad (4)$$

For a given circuit configuration, Equation 4 may be written as $$P = \frac{k V f I_m}{I_c \eta_0^2} \quad (5)$$

where $$k = \frac{16 W a \epsilon_0}{L^2 G} \left( \frac{2R + R_m}{R} \right) \quad (6)$$

Alternatively, the constant $k$ can be measured experimentally if the pressure can be measured by an independent technique. In either case, the ammeter can be calibrated in terms of pressure by employing Equation 5.

The above described method of calibrating the ammeter is intended to be merely illustrative, rather than definitive, of the invention. Other methods for calibrating the ammeter, for calibrating the electron beam current, and for deflecting the electron beam could alternatively be used. Further, devices other than the bridge circuit could be used for comparing and indicating the electron beam currents. Various other modifications may be made by those skilled in the art without departing from the spirit and scope of the invention.

What is claimed is:

1. In combination:
 means for forming and projecting a beam of electrons along an undeflected path;
 means for periodically deflecting the beam, thereby causing it to flow along a predetermined deflected path;
 a shield having a first aperture located on the undeflected path and a second aperture located on the deflected path;
 said shield comprising means for collecting all electrons that do not pass through the first or second apertures;
 means for collecting all electrons that do pass through the first or second apertures;
 and means for indicating any difference of electron beam current through the first and second apertures.

2. The combination of claim 1 further comprising:
 means for trapping ions in the undeflected electron beam comprising a first pair of positively biased rods on opposite sides of the central axis adjacent the shield, and a second pair of positively biased rods on opposite sides of the central axis adjacent the beam forming means.

3. The combination of claim 1 further comprising:
 means for calibrating the electron beam current projected from the beam forming means comprising a direct-current voltage source;
 said direct-current source comprising means for deflecting the electron beam to flow through the second aperture;
 and means for channeling a predetermined proportion of the electron beam current through the second aperture resulting from beam deflection by the direct-current source through the indicating means.

4. A device for measuring gas pressure comprising:
 an electron gun for forming and projecting a beam of electrons along a central axis;
 a shield interposed between the gun and the first collector having a first aperture along the central axis and a second aperture displaced from the central axis;
 said shield comprising means for collecting all electrons that do not flow through the first or second apertures;
 means for periodically deflecting the beam from the first aperture to the second aperture;
 a first collector for collecting electrons which flow through the first aperture;
 a second collector for collecting electrons which flow through the second aperture;
 a first filter network connected to the first collector and a second filter network connected to the second collector;
 the first and second filter networks being substantially identical and being conductively connected;
 the time constants of filter networks being longer than the period of each electron beam deflection;
 and means for indicating any voltage difference between the first and second collectors.

5. Apparatus for measuring low gas pressures comprising:
an envelope having a central axis for containing a sample of the gas to be measured;
means for forming and projecting an electron beam along said central axis;
a first electron collector intercepting said central axis;
a shield plate between the first collector and the beam forming means having an aperture along the central axis for permitting passage of part of said beam;
the aperture having a smaller area than the cross-sectional area of the beam;
said shield plate having a second aperture displaced from the first aperture and being of the same size as the first aperture;
a pair of deflecting plates between the shield plate and the beam forming means for periodically deflecting the beam from the first aperture to the second aperture;
a second collector for collecting those electrons that flow through said second aperture;
and means for indicating the current that flows through the first and second collectors.

6. A manometer comprising:
an envelope for containing a sample of gas the pressure of which is to be measured;
an electron gun within the envelope forming and projecting a beam of electrons along a central path;
a shield having a first aperture along the central path and a second aperture displaced from the central path;
means comprising a pair of deflection plates and a square wave generator for periodically deflecting the beam from the first aperture to the second aperture;
said shield comprising means for collecting all beam electrons that do not pass through the first or second apertures;
a first collector for collecting electrons that pass through the first aperture;
a second collector for collecting electrons which flow through the second aperture;
the first and second apertures being of substantially the same size and having a smaller area than the cross sectional area of the beam in the absence of ion neutralization of electron beam space-charge forces;
a first filter network connected to the first collector;
a second filter network connected to the second collector;
the first and second filter networks being substantially identical, being conductively connected, and each comprising a resistane and capacitance in parallel;
the time constants of the filter networks being longer than the period of electron beam deflection;
and means for indicating voltage differences between the first and second collectors.

7. The manometer of claim 6 further comprising:
means for calibrating the electron beam current comprising a direct-current voltage source;
said direct-current voltage source comprising means for deflecting the electron beam to flow through the second aperture toward the second collector;
and means for channeling a predetermined proportion of the current in the second collector resulting from beam deflection by the direct-current voltage source through the indicating means.

References Cited by the Examiner

UNITED STATES PATENTS

| | | | |
|---|---|---|---|
| 2,024,979 | 12/1935 | Metcalf | 315—21 X |
| 2,547,107 | 4/1951 | Anderson | 315—21 X |
| 2,613,340 | 10/1952 | Kliever | 315—21 X |
| 2,648,818 | 8/1953 | Cohen | 324—33 |
| 2,843,678 | 7/1958 | Skellett | 315—21 X |
| 2,855,540 | 10/1958 | Hoover et al. | 315—21 X |
| 2,990,513 | 6/1961 | Arnold | 315—21 X |

RUDOLPH V. ROLINEC, *Primary Examiner.*

FREDERICK M. STRADER, *Examiner.*

C. F. ROBERTS, *Assistant Examiner.*